United States Patent [19]

Stubben

[11] 4,445,114

[45] Apr. 24, 1984

[54] APPARATUS FOR SCROLLING A VIDEO DISPLAY

[75] Inventor: David R. Stubben, Milpitas, Calif.

[73] Assignee: Atari, Inc., Sunnyvale, Calif.

[21] Appl. No.: 193,699

[22] Filed: Oct. 3, 1980

Related U.S. Application Data

[63] Continuation of Ser. No. 3,447, Jan. 15, 1979.

[51] Int. Cl.[3] .............................................. G09G 1/16
[52] U.S. Cl. .................................... 340/726; 340/734; 340/749
[58] Field of Search ............... 340/723, 724, 726, 705, 340/744, 747, 749, 734

[56] References Cited

U.S. PATENT DOCUMENTS

| | | | |
|---|---|---|---|
| 3,011,164 | 11/1961 | Gerhardt | 340/724 |
| 3,242,470 | 3/1966 | Hagelbarger et al. | 340/724 |
| 3,396,377 | 8/1968 | Strout | 340/750 |
| 3,594,757 | 7/1971 | Gard et al. | 340/724 |
| 3,611,348 | 10/1971 | Rogers | 340/724 |
| 3,781,850 | 12/1973 | Gicca et al. | 340/717 |
| 4,068,225 | 1/1978 | Lee | 340/724 |
| 4,129,859 | 12/1978 | Iwamura et al. | 340/724 |

Primary Examiner—Marshall M. Curtis
Attorney, Agent, or Firm—Townsend & Townsend

[57] ABSTRACT

A video game includes apparatus for scrolling playfield objects appearing on the display unit of the game. The apparatus selectively offsets the address used to access an addressable random access memory containing data indicative of the TV picture displayed. The random access data, when accessed, is used to address a video data memory which provides the building block components of the video display. Further scrolling effect is obtained by selectively delaying the video data communicated to the video display unit.

19 Claims, 10 Drawing Figures

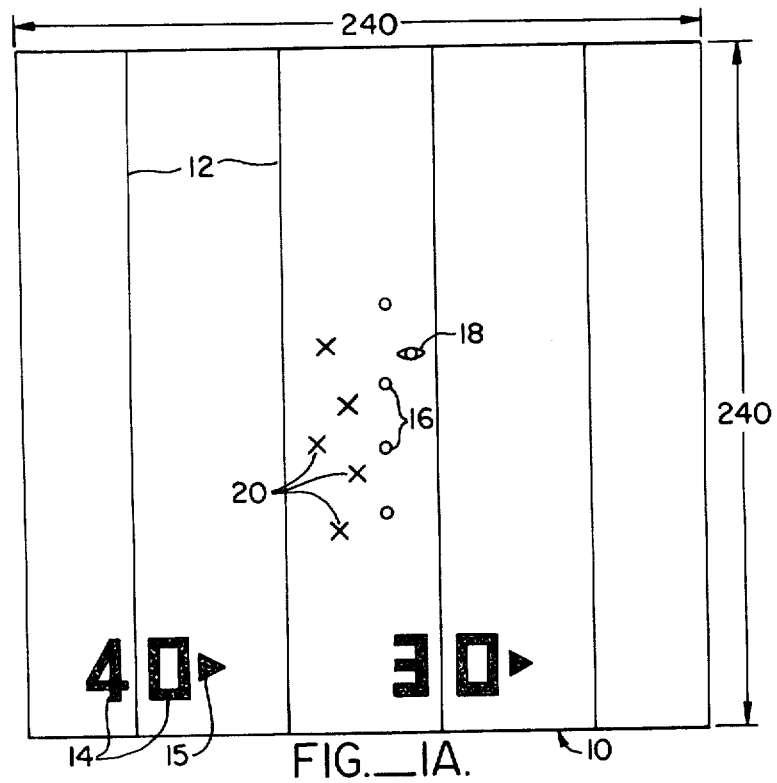
FIG._1A.
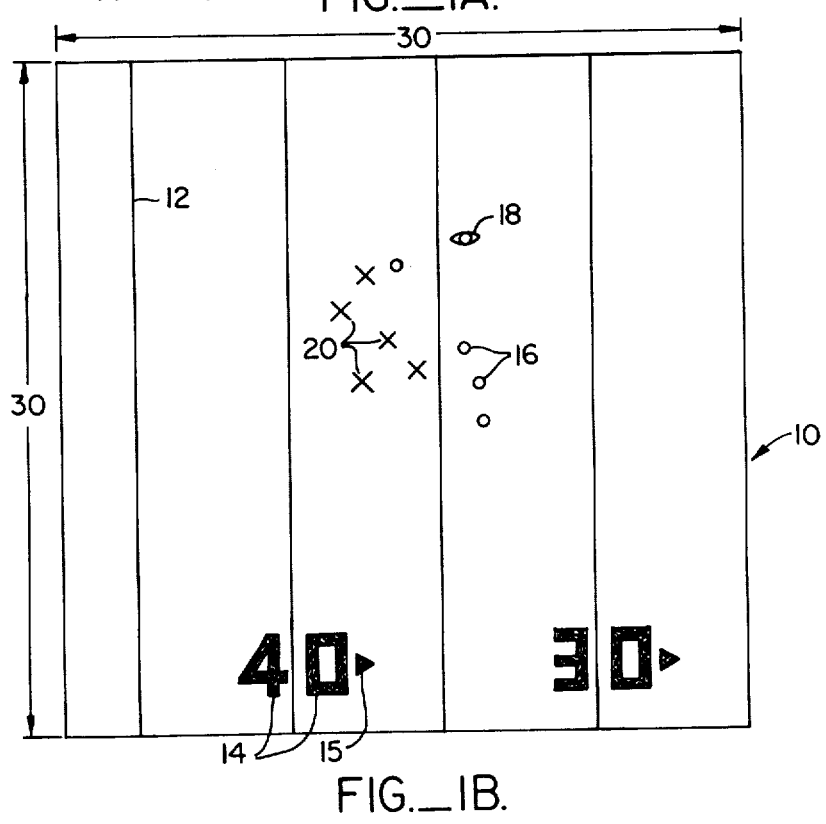
FIG._1B.

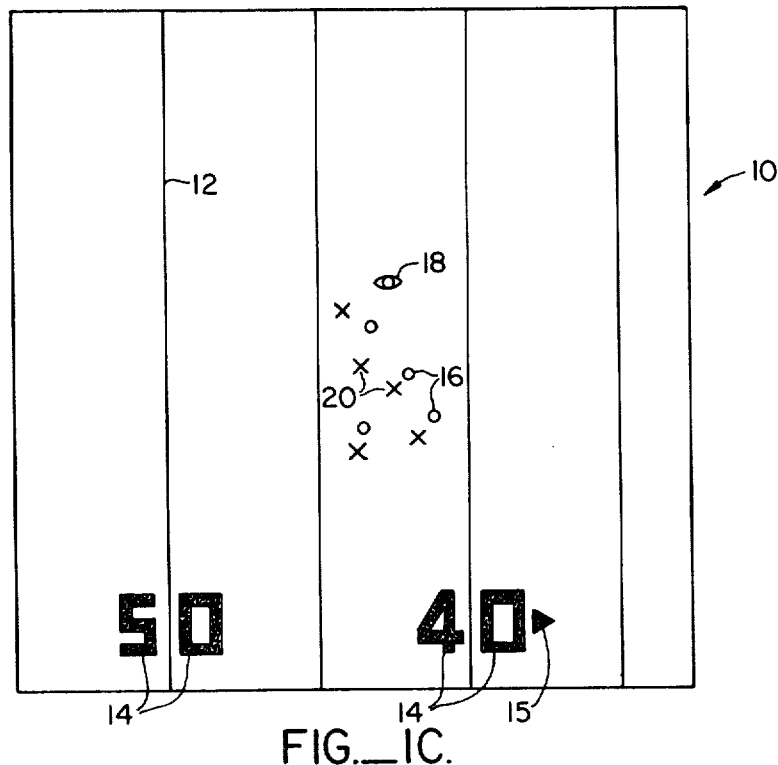
FIG.—1C.
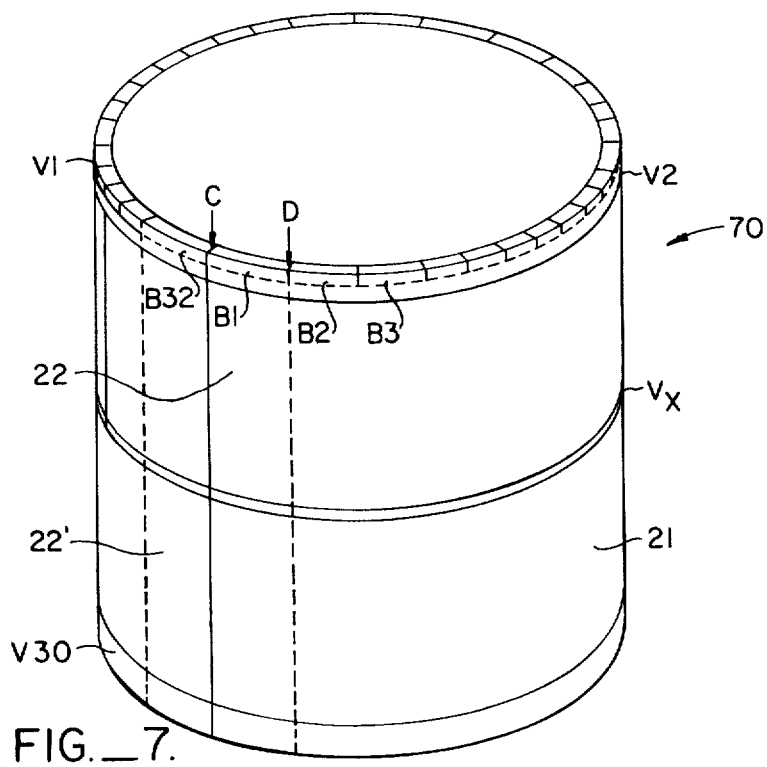
FIG.—7.

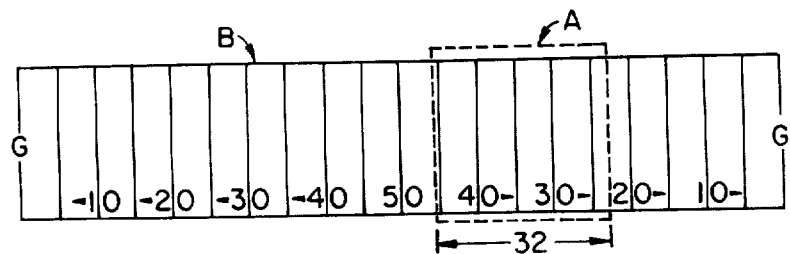
FIG._2.
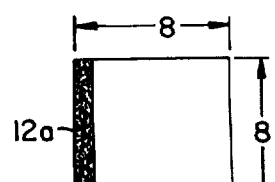
FIG._3A.
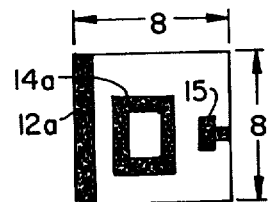
FIG._3B.
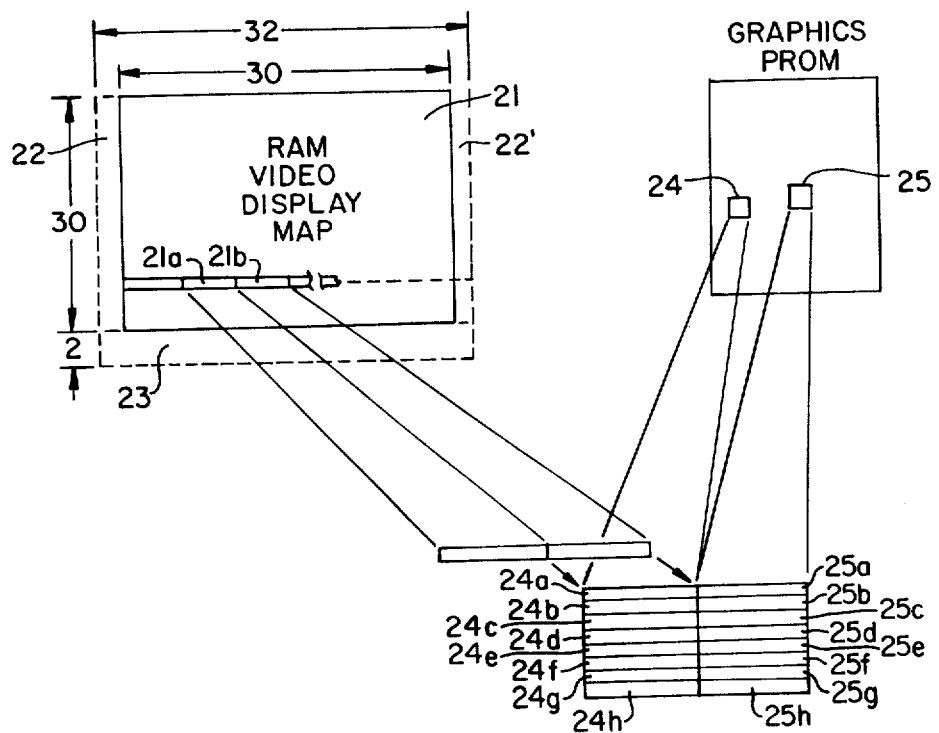
FIG._4.

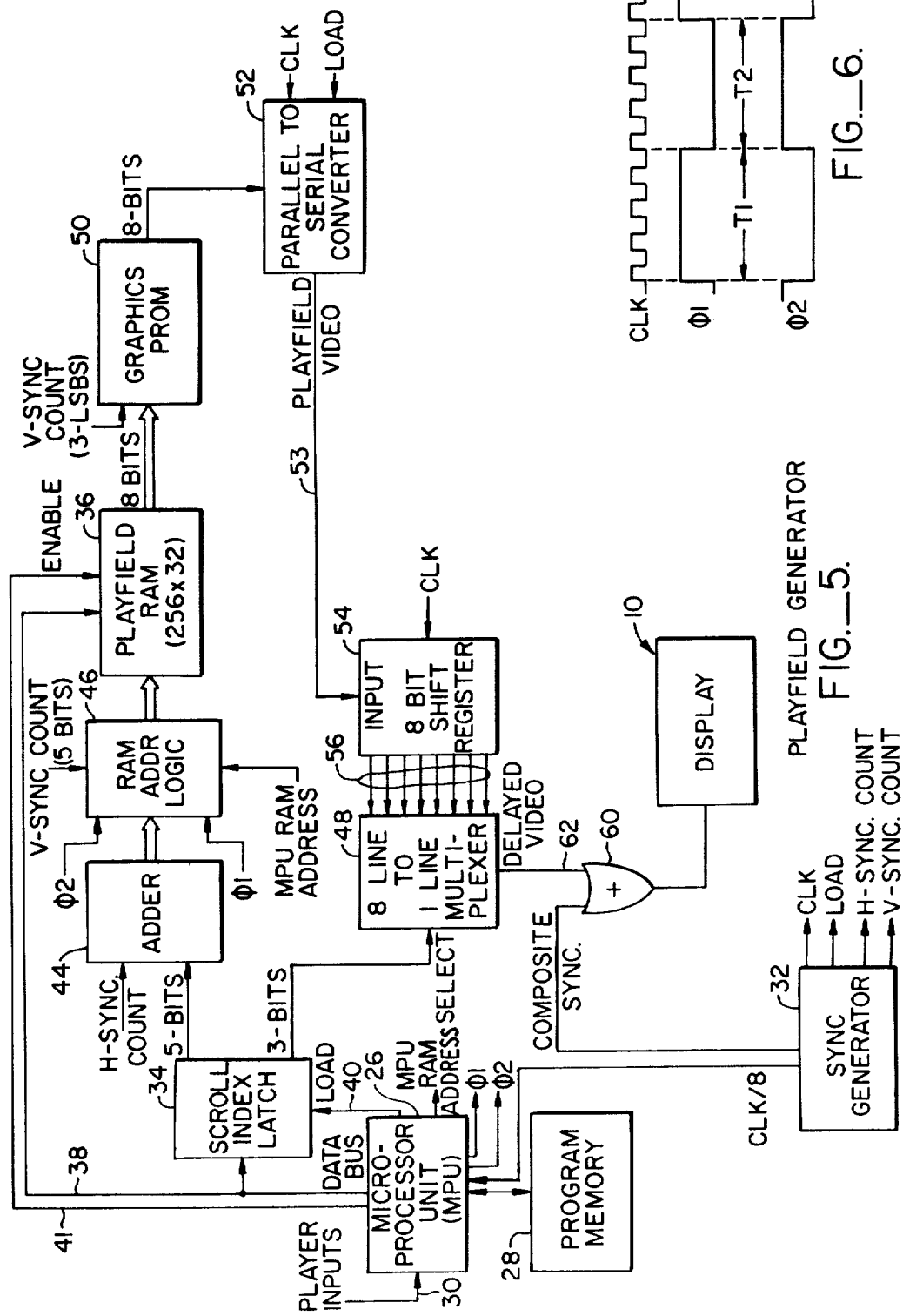

APPARATUS FOR SCROLLING A VIDEO DISPLAY

This is a continuation of application Ser. No. 3,447, filed Jan. 15, 1979.

BACKGROUND OF THE INVENTION

The present invention is directed to apparatus for moving an entire video display in a scrolling fashion and more particularly to a video game in which the display is scrolled in the horizontal direction under synchronous microprocessor control in response to player inputs.

In a video system where it is desired to display selected video portions of a larger available field, one technique has been to use a mechanical pictorial map with the television camera on an XY table; that is, a table which moves left and right or up and down. Such a technique is termed "scrolling" since the field is effectively being scrolled past the video camera from a relative motion standpoint. An analogous non-mechanical known technique uses a large capacity graphics computer which has the entire field stored in a pictorial memory, the computer providing a window on that memory to produce the display world on the TV screen. This latter method, of course, requires a very large program memory.

One technique for scrolling in the vertical direction only is shown in commonly assigned, co-pending Application Ser. No. 868,932, filed Jan. 12, 1978, now U.S. Pat. No. 4,169,272, issued Sept. 25, 1979, entitled "Apparatus for Simulating a Perspective View of a Video Image and for Storing Such Image With a Minimum Number of Bits" in the name of Rains, et al. This technique utilizes a vertical counter to directly address a graphics read-only memory (ROM) at different locations. Such a ROM, of course, includes the entire field. The technique, however, is not particularly adaptable to scrolling in a horizontal direction.

It can be seen, therefore, that there exists a need for apparatus capable of scrolling a video display in a horizontal direction, which utilizes a minimum of memory space and circuitry. Such a technique would obviate the need for expensive and complex apparatus such as television cameras or large program memories described above.

SUMMARY OF THE INVENTION

The present invention comprises an apparatus for scrolling a video display which is simple to construct, inexpensive and easy to implement. The apparatus includes a playfield random access memory (RAM) for containing data indicative of the video display. The data is stored at addressable locations corresponding to unique locations on the video display. A read-only memory (ROM) contains pictorial video data representative of a plurality of objects with such objects forming the video display. The ROM is responsive to the data of the RAM to provide actual video display information which is transmitted to the video display via a converter that converts the information to serial video. Scrolling is effected by generation of a scroll index in the form of a multi-bit digital word. A portion of the scroll index is used to modify the position information address of the playfield RAM. The remaining portion of the scroll index is used to select one of a plurality of delays for the video data provided by the converter unit in order to provide a vernier position adjustment for the displayed video data.

BRIEF DESCRIPTION OF THE DRAWINGS

FIGS. 1A, 1B and 1C are plan views of video images illustrating the present invention;

FIG. 2 is a conceptual illustration of an entire playfield capable of being displayed and showing the portion of the field selected for display;

FIGS. 3A and 3B are examples of the building block graphics used to construct a playfield display;

FIG. 4 is a map of the information stored in the RAM and illustrates the correlation between the RAM information and the building block graphics stored in a graphics PROM;

FIG. 5 is a block diagram illustrating the circuit logic used to practice the method of the present invention;

FIG. 6 is a representative timing diagram illustrating access to the RAM on a time-share basis; and FIG. 7 is a diagrammatic illustration of a portion of the contents of the RAM.

DETAILED DESCRIPTION OF THE PREFERRED EMBODIMENTS

The present invention is most advantageously practiced in conjunction with generating objects on a video display screen of the type utilizing an image-forming beam that traverses the screen along a plurality of sequentially scanned horizontal lines. Movement of the beam is synchronized to the video data supplied by the invention by conventional horizontal and vertical synchronizing signals, including horizontal and vertical retrace intervals.

Typical video images and the sequential relationship between them, as they are shown on video display screen 10 are illustrated in FIGS. 1A-1C and 2, the FIGS. 1A-1C being shown in relative progressing time sequences. These video images are used in a game termed "FOOTBALL" where game players, by means of manually controllable input devices, control the relative position of the movable objects displayed in accordance with certain instructions that are provided. For the purpose of the following discussion, it should be understood that the video scan lines generated on display 10 by the image-forming beam are oriented perpendicular to the yard lines designated in FIGS. 1A-1C by the reference numeral 12.

Typically, video objects displayed on video display screen 10 may be categorized as playfield objects and movable objects. Playfield objects, such as yard lines 12, the numerals 14, and direction pointers 15, are termed playfield objects which are scrolled as an indirect result of player inputs. The second category, termed movable objects, comprise offense players designated by O's 16, including ball carrier 18, and defense players designated by X's 20.

Conceptually, the playfield objects shown on video display screen 10 are a selected portion of a larger field of playfield objects; that is, as FIG. 2 illustrates, display 10 presents a viewer with a window-like view A of a larger field B. Here, the view A is movable along the field B between the opposing representative goal lines G. The field B may be thought of as being broken up into an M by N matrix of smaller building blocks—termed "stamps"—for the purpose of displaying these various playfield building blocks or stamps to construct the actual video display elements making up the field (e.g., yard markers 12 and numerals 14) as well as other information such as messages (not shown). As described more particularly below, these stamps are listed and have their actual video display characteristic or shape stored in a graphics memory. A yard line 12, for example, is composed of several stamps which are selected and arranged in proper format for display as will be more particularly discussed. As FIG. 1B indicates, the video produced on display 10 is formed from a 30×30 array of these stamps.

The game is played by players selecting offensive and defensive plays to set the game in motion. Operation of manual controls by players of the game will effect movement of objects 16, 18 and 20. Thus, for example, a player operating controls (not shown) that effect and direct movement of the "offensive" movable objects 16 and 18 can cause them to move away from the representative 30-yard line and toward the 40-yard line (FIG. 1A). At the same time, of course, the defensive player would manipulate controls to move the defense movable objects 20 in an attempt to establish video display coincidence between at least one of the defensive movable objects 20 and ball carrier 18 to establish a representative tackle. Depending upon the success (or lack thereof) of the game players in controlling their respective ones of the movable objects 16, 18 or 20, representative movement of the field of play between goal lines G will be effected by sequentially displaying selected portions of the overall field B, i.e., by "scrolling" the field B. Thus, for example, one play of the game may commence at a field position as represented by FIG. 1A and progress as illustrated by FIG. 1B and then by FIG. 1C.

As the ball carrier object 18 moves in either direction between goals G of the representative field, the yard line markers and numerals associated therewith move in a direction (a horizontal direction as viewed in FIGS. 1A–1C) that simulates travel of the motion objects along the length of the field B.

The present description concerns only the generation of playfield objects. Movable object generation can be accomplished in the manner disclosed in U.S. Pat. No. 4,116,444, but is preferably accomplished in accordance with the teachings of commonly assigned, co-pending application Ser. No. 003,445, filed Jan. 15, 1979, in the names of David R. Stubben and Lyle V. Rains. The disclosure of each of the above is hereby incorporated by reference.

The field B exists only in theory, and selected portions of the information required for specifying the graphics to be displayed are periodically constructed and stored in a random access memory (RAM) by a microprocessor unit as will be described below. For the purposes of the present discussion, however, it is convenient to think of the field B as existing in some memory location as an ordered matrix of stamp selection information.

There are, in fact, relatively few stamps used to construct a playfield display. FIGS. 3A and 3B illustrate two representative stamps. FIG. 3A illustrates the stamp of a yard marker segment 12a, while FIG. 3B illustrates an alpha numeric stamp comprising a zero numeral 14a, pointer 15 and a yard marker segment 12a. Other stamps used in the football game under discussion include the numerics 1–5, and the letter G to designate the goal line. As will now be apparent, yard marker stamps, such as that shown in FIG. 3A, are displayed in a vertical column to form one of the yard markers 12 illustrated in FIGS. 1 and 2.

In the preferred embodiment, each stamp is an 8×8 element array of data bits used to form the actual display graphics. Elements in both the horizontal and vertical directions are the smallest resolution elements of the video display which has, as indicated in FIG. 1A, 240 elements (beam positions) for each horizontal line and 240 raster lines. Thus, a playfield is constructed on display 10 by selecting and positioning the desired stamps to form a 30×30 stamp array on the display (FIG. 1B).

The information indicative of the relative position of each stamp to be displayed is stored in a random access memory. This information is used to address a graphics programmable read-only memory (PROM) in which the stamps are stored, the output of which provides the actual graphics for the video display. The information stored in the RAM is arranged so that sequential addressing of the RAM will cause the PROM to provide the graphics necessary for an ordered 30×30 array of stamps. Thus, data stored in the RAM is only indicative of the video display.

FIG. 4 illustrates the correlation between the contents of the RAM and PROM. As indicated, the RAM has 32×32 storage locations, each storage location being one byte (eight digital bits) in size. During actual scan time (i.e., during display of one video field of playfield graphics) only the graphics specified by the information stored in the 30×30 RAM portion designated by reference numeral 21 is actually displayed. However, the entire RAM portion designated by reference numerals 21, 22 and 22' is addressed. The information stored in the one-byte columns 22 and 22' are used for updating purposes described below and do not result in the display of graphics in video display 10. A row 23 of stored information is used for control of the movable objects 16, 18, 20, which forms no part of this invention.

As noted above, each of the addressable entries of memory portion 21 of the RAM is permanently associated with or corresponds to a unique location in the video display 10. The information kept at each RAM entry designates the particular location in the PROM containing the stamp to be displayed at the video display location corresponding to that entry. For example, as FIG. 4 illustrates, entry 21a contains information that, when applied to the PROM, causes the PROM to provide stamp 24. The next sequential entry 21b causes the PROM to provide stamp 25.

As FIG. 4 also illustrates, each stamp comprises 8 bytes, each byte containing 8 bits of graphics data, used when assembled to form the 8×8 stamp array referred to above. Further, each of the RAM entries designates an 8-byte stamp—just as, for example, entry 21a designates the 8 bytes 24a–24h that comprise stamp 24 in FIG. 4. Similarly, the next successive RAM location 21b designates stamp 25 comprising 8 bytes 25a–25h. Selection of the individual ones of the bytes 24a–24h and 25a–25h to be displayed during each horizontal line scan is accomplished in the manner described below.

Turning now to FIG. 5, the playfield generator of the present invention includes a microprocessor 26 to which is connected a program memory 28 to provide for overall control of the various units comprising the apparatus. Input ports 30 to the microprocessor 26 communicate motion signals from the player controls (not shown) to the microprocessor 26. Timing pulses for synchronizing microprocessor control with the display video, as well as for providing control for various playfield generator functions, are generated by a sync generator 32. Thus, sync generator 32 provides a first clock (CLK) signal used by the generator to effect certain synchronous clocking operations and a second clock (CLK/8) signal for use by microprocessor 26. In addition, the sync generator 32 contains internal horizontal and vertical sync counters (not shown) clocked by the CLK signal and which produce H-sync and V-sync counts, respectively. Each counter is a modulo 256 counter and the counts produced are used for control and addressing functions of the playfield generator as will be described. These counts (i.e., H-sync and V-sync) are also used by sync generator 32 to produce a composite sync signal which is combined with the video generated by the playfield generator to drive display 10. In effect, therefore, the H-sync and V-sync counts provide the playfield generator with information specifying the position of the beam used to construct display 10 during each line scan. Finally, sync generator 32 provides a periodic load signal (LOAD) to effect information transfers, as will be explained below.

Microprocessor 26 is coupled to a scroll index latch 34 and a playfield random access memory (RAM) 36 by a data buss 38, which communicates digital information to these elements—typically in one-byte (eight bit) segments. Microprocessor 26 is also coupled to the scroll index latch 34 by a load line 40 which commands the latch to accept and temporarily store information appearing upon the data buss 38. Similarly, an enable line 41 communicates write instructions from the microprocessor to the playfield RAM 36 to cause the RAM to store data present on the data buss 38.

The scroll index latch 34 stores one-byte (eight bits) of digital information. A first portion of each byte (five of the eight bits in the preferred embodiment) of information held by the scroll index latch 34 is communicated to playfield RAM 36 via an adder 44 and a RAM address logic unit 46. A second portion of the same byte (the three remaining bits) held by scroll index latch 34 is communicated to an 8-to-1 multiplexer 48.

The RAM 36 is capable of being addressed by the microprocessor 26 or by adder 44 and a portion of V-sync count in direct memory access (DMA) mode. In order to address the 32×30 array (equalling 960 bytes) of stamp positional information formed by RAM portions 21, 22 and 22' (FIG. 4), at least a 10-bit address is required, which provides the capability of addressing $2^{10}$ or 1024 locations. The address generated for RAM access during DMA mode (hereinafter designated the DMA generated address) comprises the five most significant bits (MSB's) of V-sync count (which selects one of 30 lines of 32 bytes), and a five-bit sum of the five MSB's of H-sync count and the first (5-bit) portion of the scroll index (which selects one of the 32 bytes in the selected line). Any carry generated is discarded.

It should be noted that the DMA generated address provides, in effect, modulo 32 addressing of the 32 bytes in each row of the 32×30 byte playfield array stored in RAM 36. That is, the five MSB's of H-sync count provide the addressing for 32 bytes during each horizontal scan time. However, by adding the 5-bit portion of the scroll index to H-sync count, a row of 32 bytes is still addressed, but the first and each succeeding byte read out of the RAM 36 are shifted in time or offset by the 5-bit portion of the scroll index—relative to H-sync count.

FIG. 7 is a schematic illustration of this offset. Portions 21, 22 and 22' of the RAM map of FIG. 4 are shown as a cylinder with the left and right edges of the map joined at vertical line C. If the 5-bit portion of the scroll index (contained in scroll index latch 34) is zero, no offset is effected. The DMA generated address begins at row V1, byte B1 and sequentially addresses each succeeding byte of the row V1 until byte B32 is reached, at which time addressing begins again with byte B1 of either row V1 or the next succeeding row V2. If, however, the 5-bit portion of the scroll index is non-zero, the H-sync count is offset by a corresponding amount, and addressing begins and ends with different bytes in the same row. Thus, for example, if the 5-bit portion of the scroll index increases or offsets H-sync count by one, the addressing of each row (V1-V30) of the map begins at byte B2, progresses through to B32 and ends by addressing byte B1; that is, the RAM map 70 has been precessed by one byte from vertical line C to vertical line D. The effect is to scroll the video display by one stamp column.

The RAM address logic 46 contains logic circuitry of known design that selects the addressing (MPU RAM addressing or the DMA generated address) for RAM 36 in several ways. First, the RAM address logic 46 communicates the MPU RAM address from the microprocessor 26 to the RAM during the horizontal and vertical retrace intervals. During active scan time, the address logic 46 interleaves communication of an address formed by the information provided by adder 44 and V-sync count with the MPU RAM address to the RAM. This interleaving is accomplished in response to ∅1 and ∅2 clock signals provided by microprocessor 26. The relationships between the ∅1, ∅2 and CLK signals are illustrated in FIG. 6; ∅1 and ∅2 are generated by the microprocessor from the CLK/8 signal provided by the sync generator 32. The ∅1 and ∅2 clock signals (as is the CLK/8 signal) are the CLK signal divided by eight.

The RAM 36 address interleaving is accomplished by multiplexing the MPU RAM address and the DMA generated address using the ∅1 and ∅2 signals as a multiplex control. Thus, during the time designated as T1 in FIG. 6, the DMA generated address is gated to the RAM 36; during the time designated as T2, the MPU RAM address is gated to the RAM 36.

As noted above, playfield RAM 36 contains data at specific addressable locations that are indicative of the display position of the various playfield building block stamps. These stamps are listed and have their actual display characteristics or shape stored in a graphics PROM 50. Graphics PROM 50 is controlled by playfield RAM 36, in conjunction with the three least significant bits (LSBs) of V-sync count to access the actual video display from the PROM in eight-bit segments. The manner of access establishes the arrangement and appropriate format in which the video data is to be presented on the display screen to form the particular view A of the conceptual overall field B, as indicated in FIGS. 1 and 2.

The graphics information provided by the PROM 50 is obtained by applying to the PROM an address formed from the combination of one byte of information from the RAM 36 and the three LSBs of V-sync count. The RAM information selects the particular stamp and the three LSBs of V-sync count select the particular 8-bit byte of the stamp. Thus, each one of the 30 lines of 32 bytes (FIG. 4) is read out of the RAM 36 eight consecutive times, during each field of display.

The eight bits of information provided by graphics PROM 50 are communicated and applied to parallel inputs of parallel-to-serial converter 52. The information is accepted by the converter upon receipt of the LOAD signal from the sync generator 32. Then, in response to the CLK signal, the contents of converter 50 are shifted out of the converter onto line 53, forming serial playfield video. This playfield video is applied to the input of an eight-stage, serial shift register 54, also clocked by the CLK signal. The eight parallel outputs 56 (one output from each stage) of the shift register 54 are applied to the multiplexer 48. The multiplexer 48 selects one of the eight parallel shift register outputs 56 and communicates the selected output to a summer 60 via delayed video line 62, where it is combined with composite sync from generator 32 to drive display 10.

The video display graphics information applied to the serial input of the shift register 54 is shifted through the various eight stages (not shown) of the register in response to the CLK signal applied thereto. Depending upon the states of the three bits applied to the multiplexer 48 from the scroll index latch 34, one of the eight outputs 56 of the shift register 54 is selected for communication to the video line 62 via the multiplexer 48. The playfield video displayed during the active television line is thus delayed, and therefore relatively positioned along the line, as a result of which one of the eight shift register outputs 56 is communicated to summer 60.

The playfield RAM 36 is updated as often as every third vertical blanking interval. That is, in the time period between each update of the playfield RAM, the scrolling of view A along field B (FIG. 2) has not effectively advanced far enough to necessitate an updating of the RAM. This is due in part to the fact that some scrolling of the video display is effected to some extent by delaying the video applied to the summer circuit 60. However, when the playfield RAM is updated, only one of the two columns 22, 22' of information is loaded—corresponding to the (left or right) edge of the display 10 toward which motion is proceeding.

In operation, microprocessor 26 receives player information on input ports 30 and computes playfield stamp selection information that is stored in RAM 36. During display time the RAM 36 and the PROM 50 are sequentially addressed by the H-sync and V-sync counts generated by sync generator 32. As the game progresses, requiring the playfield to be scrolled, a scroll index is calculated with the three-bit portion modified from that presently held by scroll index 34. During the next vertical blanking interval, the newly calculated scroll index is transferred to and stored in the scroll index latch 34 by the microprocessor 26. The new three-bit portion of the scroll index effects selection of a new one of the eight parallel shift register outputs 56 to cause the graphics information of each active horizontal scan line appearing on the video display to be delayed, depending upon which of the outputs 56 is selected. The video display is thus scrolled.

However, scrolling by video delay is effective for seven horizontal bits only. Once the maximum video delay is selected, the RAM 36 must be updated with a new column of information for selecting a new (vertical) column of stamps to be displayed. In addition, the 5-bit portion of the scroll index must be updated so that the H-sync count portion of the DMA generated address is offset by one to precess the addressing of RAM 36 as explained above. The 3-bit portion is also updated as appropriate. This update of RAM 36 and scroll index latch 34 can be done during the same or different vertical blanking period, so long as the RAM 36 is updated first.

In summary, the present invention effects scrolling in the scan line axis in two respects: First, the video display is scrolled by a video delay technique; this technique provides a scrolling effect having a minimum resolution equal to one horizontal bit (i.e., beam position along a given scan line) and a maximum range of seven bits. Second, a scrolling effect is produced by updating the RAM 36 with one column (30 bytes) of stamp selection information of 30 stamps and then offsetting the address applied to the RAM 36 so that the RAM is accessed at a shifted location. As noted above, 32 stamp elements are accessed from PROM 50 during each of the 240 (8×30) horizontal scan lines. However, the horizontal blanking of video display 10 is set so that the two stamp elements in columns 22 and 22' are blanked each scan line; thus, only 30 stamp elements are displayed during each active scan line of video display 10.

As will now be apparent, the present invention provides apparatus for scrolling a video display presented in raster-type format in a direction along the display lines with a minimum of additional circuitry. More specifically, the amount of memory storage required to completely define the game playfield elements (i.e., the size of the graphics PROM 50) is minimized. Thus, for games having a relatively simple playfield, such as football, a PROM of only minimal size is required. Alternatively, a plurality of sets of stamps, each defining a different playfield, may be stored in a single PROM of reasonable size, thus permitting the construction of a video game apparatus affording a wide variety of different games, with some or all of the games having the scrolling feature.

While the above provides a full and complete disclosure of the preferred embodiment of the present invention, various modifications, alternate constructions and equivalents may be employed without departing from the true spirit and scope of the invention. For example, some scrolling can also be effected in the vertical direction by offsetting the V-sync count used to address the RAM 36 as well as by updating the RAM with lines of information of 32 stamps. Therefore, the above description and illustrations should not be construed as limiting the scope of the invention, which is defined by the appended claims.

I claim:
1. Apparatus for controlling the display of symbols on a raster type display comprising:
   timing means for generating timing signals;
   means for providing an index command indicative of a desired offset in the positioning of said symbols on said raster-type display;
   first memory means for storing graphics data representative of said symbols to be displayed and communicating selected elements of the graphics data to said display in response to received address data;
   second memory means for storing addresses corresponding to said symbols, and for communicating to the first memory means a selected sequence of said addresses, said sequence selected in response to an offset address;
   address means for deriving the offset address from the timing signals and an offset determined by a first portion of the index command and for communicating the offset address to the second memory means; and
   delay means coupled to the address means for receiving a second portion of the index command to selectively delay communication of the graphics data in the first memory means to said display in response to the second portion of the index command 2. Apparatus as in claim 1 wherein:
the index command is a digital word including a plurality of bits;
the second portion of the index command comprises the least-significant bits of the digital word; and
the first portion of the index command comprises the most-significant bits of the digital word.

3. The apparatus of claim 1 wherein:
the first memory means comprises a programmable read-only memory.

4. The apparatus of claim 3 wherein the second memory means comprises a random access memory.

5. The apparatus of claim 4 wherein:
said graphics data comprises a digital word having a plurality of bits; and
the delay means selectively delays communication of the graphics data to the display by communicating a selected one of the bits in response to the second portion of the index command.

6. The apparatus of claim 5, wherein the delay means includes shift register means, having an input and a number of outputs, and means responsive to said second portion of said index for selectively communicating one of the shift register means outputs to said display.

7. The apparatus of claim 1 wherein:
the graphics data comprises a digital word having a plurality of bits; and
the delay means selectively delays communication of the graphics data to the display by communicating a selected one of the bits in response to the first portion of the index command.

8. The apparatus of claim 7, wherein the delay means includes shift register means, having an input and a number of outputs, and means responsive to said second portion of said index command for selectively communicating a one of the shift register means outputs to said display.

9. Apparatus for controlling the display of symbols on a raster type display comprising:
timing means for generating timing signals;
means for providing an index command indicative of a desired offset in the positioning of said symbols on said display;
memory means for storing graphics data representative of said symbols to be displayed, and for communicating sequences selected of the graphics data to said display in response to a received offset address;
delay means for selectively delaying communication of the graphics data in the memory means to the display, in response to a first portion of the index command; and
address means for communicating the first portion of the index command to the delay means, and for deriving the offset address from the timing signals and a second portion of the index command, and communicating the offset address to the memory means.

10. Apparatus as in claim 9 wherein:
the index command is a digital word including a plurality of bits;
the first portion of the index command comprises the least-significant bits of the digital word; and
the second portion of the index command comprises the most-significant bits of the digital word.

11. The apparatus of claim 10 wherein:
the graphics data comprises a digital word having a plurality of bits; and
the delay means selectively delays communication of the graphics data to the display by communicating a selected one of the bits in response to the first portion of the index command.

12. The apparatus of claim 11, wherein the delay means includes shift register means, having an input and a number of outputs, and means responsive to said first portion of said index command for selectively communicating a one of the shift register means outputs to said display.

13. The apparatus of claim 9 wherein:
the graphics data communicated to the display comprises a digital word having a plurality of bits; and
the delay means selectively delays communication of the graphics data to the display by communicating a selected one of the bits in response to the first portion of the index command.

14. The apparatus of claim 13, wherein the delay means includes shift register means, having an input and a number of outputs, and means responsive to said first portion of said index command for selectively communicating a one of the shift register means outputs to said display.

15. Apparatus for controlling the display of symbols on a raster type display comprising:
timing means for generating timing signals;
first memory means for storing symbol data representative of said symbols to be displayed and communicating selected elements of the symbol data to said display in response to received address data;
second memory means for storing data indicative of the addresses of the symbol data in the first memory means at addresses of the second memory means corresponding to locations on the raster-type display, and for communicating to the first memory means the data stored in selected addresses of the second memory means;
address means for generating addresses for addressing the second memory means in synchronism with scanning of the raster type display, under control of the timing signals;
indexing means for generating alterable indexing data and providing a portion of the alterable index data to the address means to alter the correspondence between locations on the raster type display and the addresses generated by the address means; and
delay means for selectively delaying communication of the symbol data from the first memory means to the raster type display, the delay being controlled by another portion of the alterable index data from said indexing means.

16. Apparatus in claim 15 wherein:
said indexing means generates alterable indexing data in the form of a digital word;
said portion of the alterable index data comprises the most significant bits of the digital word; and
said other portion of the alterable index data comprises the least significant bits of the digital word.

17. The apparatus of claim 16 wherein the delay means includes a shift register with input and a number of outputs corresponding to different delays and selecting one of the outputs in response to the least significant bits of the index word for coupling the selected output to the raster type display.

18. The apparatus of claim 17, wherein the second memory means is a read only memory.

19. The apparatus of claim 18, further including means for coupling vertical timing signals to the second memory means, the second memory means providing the pictorial data to the raster type display in response to the data addressed in the first memory means and to the vertical timing signals.

* * * * *